(12) United States Patent
Rotole et al.

(10) Patent No.: US 10,501,837 B2
(45) Date of Patent: Dec. 10, 2019

(54) METHOD AND APPARATUS FOR REAL TIME VIDEO IMAGING OF THE SNOUT INTERIOR ON A HOT DIP COATING LINE

(75) Inventors: John Anthony Rotole, Valpraiso, IN (US); Charles Krcmaric, Ogden Dunes, IN (US)

(73) Assignee: ArcelorMittal, Luxembourg (LU)

( * ) Notice: Subject to any disclaimer, the term of this patent is extended or adjusted under 35 U.S.C. 154(b) by 1098 days.

(21) Appl. No.: 13/407,375

(22) Filed: Feb. 28, 2012

(65) Prior Publication Data

US 2012/0224045 A1 Sep. 6, 2012

Related U.S. Application Data (60) Provisional application No. 61/463,993, filed on Feb. 28, 2011.

(51) Int. Cl.
| | |
|---|---|
| *C23C 2/00* | (2006.01) |
| *H04N 3/09* | (2006.01) |
| *H04N 7/18* | (2006.01) |
| *H04N 5/44* | (2011.01) |
| *H04N 5/33* | (2006.01) |
| *H04N 5/225* | (2006.01) |

(52) U.S. Cl.
CPC ............ *C23C 2/00* (2013.01); *C23C 2/003* (2013.01); *H04N 3/09* (2013.01); *H04N 7/183* (2013.01); *H04N 5/33* (2013.01); *H04N 2005/2255* (2013.01); *H04N 2005/4426* (2013.01)

(58) Field of Classification Search
CPC .......... C23C 2/00; C23C 2/003; H04N 7/183; H04N 5/33; H04N 2005/2255

USPC ............................................. 348/82; 118/713
See application file for complete search history.

(56) References Cited

U.S. PATENT DOCUMENTS 4,969,035 A * 11/1990 Dawson ........................... 348/83
5,961,285 A    10/1999 Meneice et al.
(Continued)

FOREIGN PATENT DOCUMENTS

CN       1585957 A    2/2005
CN     101135651 A    3/2008
(Continued)

OTHER PUBLICATIONS

Dae Sig Shin, Jayho Choi, San-Joon Lee; "Velocity Field Measurements of Flow inside Snout of Continuous Hot-Dip Galvanizing Process Using a Single-frame PIV Technique"; 2000; ISIJ International, vol. 40, No. 5, pp. 484-490.*

(Continued)

*Primary Examiner* — David N Werner
(74) *Attorney, Agent, or Firm* — Davidson, Davidson & Kappel, LLC (57) ABSTRACT

An apparatus and method for imaging the interior of a hot dip melt pot snout of a hot dip steel coating apparatus through the snout thereof. The system provided for high visual contrast and high resolution imaging, without the need for external illumination. The inventive apparatus and method image the interior of the hot dip melt pot snout at infrared wavelengths, and preferably in a wavelength range of 0.7 to 3 microns. The inventive apparatus and method provide valuable information about the condition of the hot dip melt pot snout and steel coating process which may be used to improve the quality of the produced coated steel.

46 Claims, 6 Drawing Sheets

(56) References Cited

U.S. PATENT DOCUMENTS

| | | | |
|---|---|---|---|
| 6,017,643 A * | 1/2000 | Kobayashi et al. | 428/653 |
| 6,420,704 B1 * | 7/2002 | Berenz | H04N 5/23296 250/201.2 |
| 7,027,619 B2 | 4/2006 | Pavlidis et al. | |
| 7,150,537 B2 | 12/2006 | Peterson et al. | |
| 7,157,838 B2 | 1/2007 | Thielemans et al. | |
| 2001/0047137 A1 * | 11/2001 | Moreno et al. | 600/475 |
| 2002/0103571 A1 * | 8/2002 | Yoo et al. | 700/228 |
| 2003/0012978 A1 * | 1/2003 | Sodani et al. | 428/659 |
| 2003/0077397 A1 * | 4/2003 | Kabeya et al. | 427/431 |
| 2004/0095584 A1 | 5/2004 | Schyns et al. | |
| 2007/0045913 A1 * | 3/2007 | Fiore | B22D 2/00 266/100 |
| 2007/0074657 A1 * | 4/2007 | Hamayoshi | C04B 35/593 118/424 |
| 2007/0125962 A1 * | 6/2007 | Okabe | 250/492.1 |
| 2007/0146700 A1 * | 6/2007 | Kowarz et al. | 356/310 |
| 2007/0225931 A1 | 9/2007 | Morse et al. | |
| 2008/0063389 A1 * | 3/2008 | Fang et al. | 396/56 |
| 2009/0079841 A1 | 3/2009 | Leard et al. | |
| 2010/0129672 A1 | 5/2010 | Hao et al. | |
| 2010/0209591 A1 * | 8/2010 | Eriksson et al. | 427/8 |
| 2010/0226091 A1 * | 9/2010 | Dunn | 361/695 |
| 2012/0287285 A1 * | 11/2012 | Jensen | B01J 2/04 348/159 |

FOREIGN PATENT DOCUMENTS

| | | |
|---|---|---|
| CN | 1413343 A | 8/2008 |
| CN | 101248915 A | 8/2008 |
| CN | 101849030 | 9/2010 |
| EP | 2003413 A2 | 12/2008 |
| EP | 2224173 A2 | 9/2010 |
| EP | 1261951 B1 | 8/2012 |
| JP | H06265683 A | 9/1994 |
| JP | 2000282201 A * | 10/2000 |

OTHER PUBLICATIONS

G. Hannemyr, "IR Photography", DPanswers, online (archived version of Feb. 22, 2012). (Year: 2012).*

Shin, Choi and Lee, Velocity Field Measurements of Flow inside Snout of Continuous Hot-Dip Galvanizing Process Using a Single-frame PIV Technique, ISIJ International, vol. 40 (2000), No. 5, pp. 484-490.

Liu et al., "Multifunctional Metallic and Refractory Materials for Energy Efficient Handling of Molten Metals.", Technical Report, West Virginia University., (Jan. 21, 2009), URL: http://www.osti.gov/bridge/servlets/purl/947111-M4fmx8/947111.pdf, (Dec. 6, 2012), XP008171868.

English Abstract of JPH06265683 (Sep. 22, 1994).

English Abstract of CN101248915 (Aug. 27, 2008).

* cited by examiner

METHOD AND APPARATUS FOR REAL TIME VIDEO IMAGING OF THE SNOUT INTERIOR ON A HOT DIP COATING LINE

CROSS-REFERENCE TO RELATED APPLICATIONS

This Application claims the benefit under 35 U.S.C. 119(e) of U.S. Provisional Application No. 61/463,993 filed Feb. 28, 2011.

FIELD OF THE INVENTION

The present invention relates methods and apparatuses for imaging the interior of a hot dip melt pot snout of a molten metal coating line. More specifically the invention relates to viewing the interior of the hot dip melt pot snout without the use of external illumination. Most specifically, the present methods and apparatuses use camera systems that can image in the infra red and preferably in the near infra red to short wave infrared region (i.e. 0.7 to 3 μm region of the IR spectrum).

BACKGROUND OF THE INVENTION

In the manufacturing industries, there is a large and continuously growing demand for flat steel (sheet, strip, coil, etc) coated with protective alloys such as zinc and aluminum based alloys. To manufacture these products, a coating process known as hot dip melt coating is used. A simplified description of the process will now be described.

Figure 1:
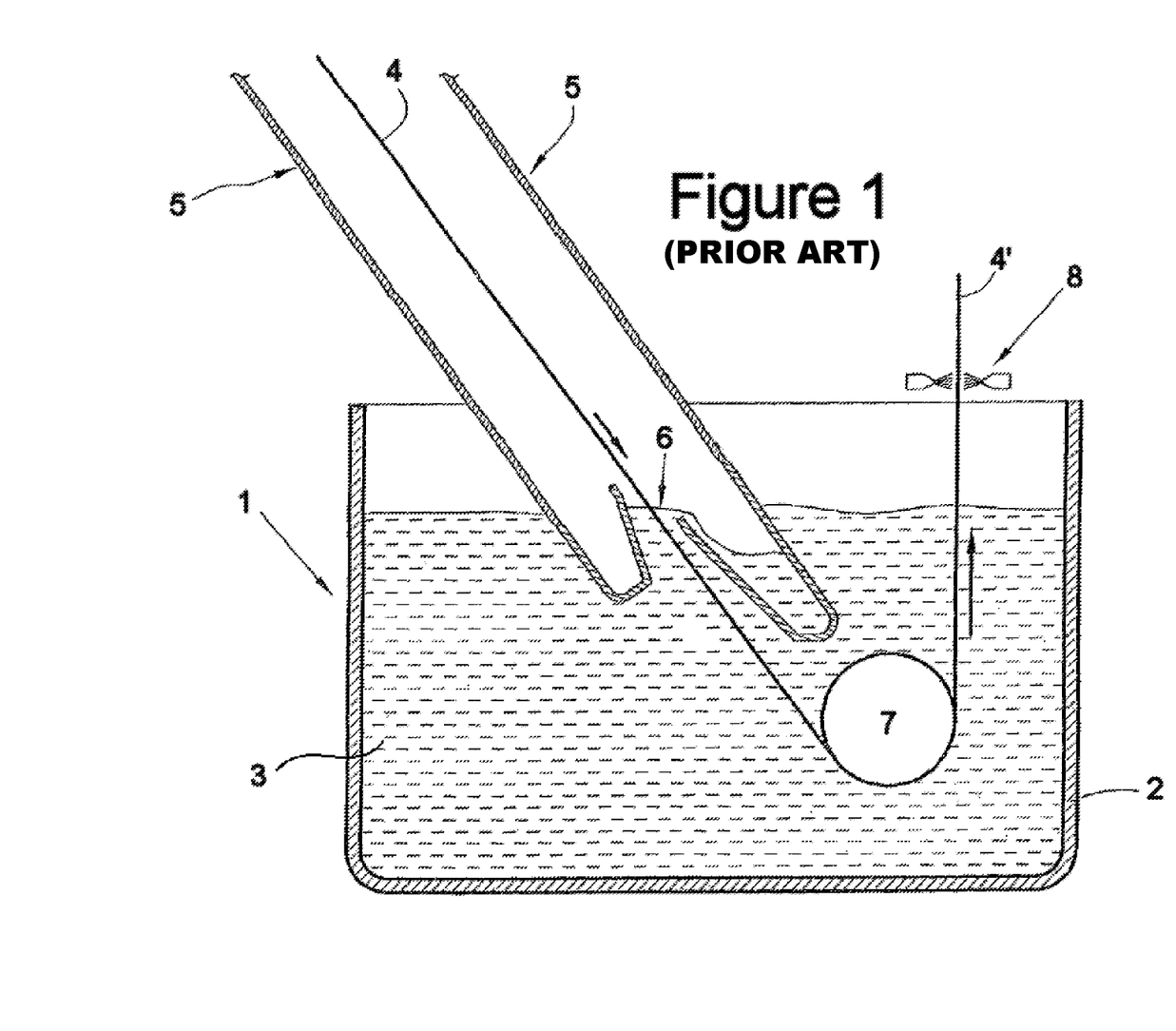
FIG. 1 is a highly simplified diagram of a hot dip melt coating apparatus.

Elongated steel sheet material is hot and/or cold rolled to form a "strip" which may be wound into a "coil". The coiled steel strip is uncoiled and passed through a bath of molten metal that coats the surface of the strip. FIG. 1 shows a highly simplified diagram of the apparatus hereinafter designated as a hot dip melt coating apparatus 1. The apparatus includes a melt pot 2 filled with molten metal 3 to be coated onto the bare steel strip 4. The bare steel strip 4 enters the hot dip melt coating apparatus 1 through a snout 5. The interior of the snout 5 has a reducing or inert atmosphere to prevent the bare steel strip 4 from oxidizing. The bare steel strip 4 travels downward into the molten metal 3 at the melt surface 6. This region within the snout 5 where the bare steel strip 4 first enters the molten metal 6 is of critical importance to the quality of the final coated product. Once the steel strip is fully submerged in the molten metal 3, it is passed around a roller and up out of the molten metal 3. The emerging strip is coated with metal. Once the coated strip exits the molten metal 3, various means are used to control coating thickness and uniformity 8. Once the molten coating has cooled and/or reacted with the surface of the steel strip, the coated steel strip 4 is once again coiled (not shown) and the coils are sold to manufacturing customers.

Surface quality standards for coated products are becoming increasingly stringent as customers requirements become more demanding. As is probably apparent, the conditions under which the molten metal is deposited onto the steel strip play a large roll in the quality of the coating and the final coated strip product. However, because of the conditions under which hot dip melt coating operations occur, the "melt pot" is basically a black box into which bare steel strip, coating metal and energy are input and coated steel strip is output. It is extremely difficult to control and monitor the conditions within the "black box" and, as such, when there are quality problems, it is often not known where the problems arose. Thus, even when changes to the system are made, the changes to the output product are not known quickly and require quality analysis of the product. If the desired improvements are not achieved or the quality worsens, hot dip coating line (HDCL) operators must make additional educated guesses at what is causing the quality errors. Alleviating the quality issues is very important because strip material which is not of superior quality will, at best, be sold at a very unfavorable price, and at worst, be scrapped at a significant loss.

As described above, the hot dip melt pot is basically a black box. In an attempt to better understand and more readily control the interior workings of the black box, viewing ports have been provided in what is called the "snout" of the coating apparatus. These view ports allow visual access to the interior of the hot dip melt pot snout. Unfortunately, the interior of the black box is relatively dark and it is very difficult to observe any useful information. Thus, illumination ports were added to the snout into which sources of illumination were shone. Now, the interior is illuminated by light. Further, visible light cameras were mounted into the view ports to view the interior of the hot dip melt pot snout. Unfortunately, this setup was also inadequate for detecting adequate information of the interior of the hot dip melt pot snout. The molten metal and metal coated surfaces are highly reflective and the light from the illumination source essentially washes out any details of the interior of the black box. The images that were received from the camera were essentially unintelligible areas of pure white and black. No useful data could be observed. Furthermore, the illumination ports would coat with molten metal dust reducing the illumination over time. Thus the ports would need to be replaced increasing the risk that oxygen and/or water vapor would enter the melt pot interior, which is typically a reducing or inert atmosphere. Similarly, the viewing ports would coat with the dust and need to be cleaned or replaced.

Thus there is a need in the art for a system to usefully image the interior of the hot dip melt pot snout. The system must provide for high visual contrast and preferably high resolution imaging.

SUMMARY OF THE INVENTION

The present invention is an apparatus and method for imaging the interior of a hot dip melt pot snout. The system provides for high visual contrast and may provide high resolution imaging, without the need for external illumination.

Once aspect of the present invention is an apparatus for imaging the interior of the hot dip melt pot snout of a hot dip steel coating line. The apparatus includes a camera which detects images within at least a desired range of infrared wavelengths within the electromagnetic spectrum. The apparatus also includes a view port transparent at least to the desired range of infrared wavelengths. The view port may be positioned to allow view of the desired regions within the melt pot. The camera may be positioned relative to the view port and to the melt pot such that the camera can image the desired regions within the melt pot at the desired range of infrared wavelengths. The apparatus may also include a monitoring device upon which the detected infrared images from the camera may be projected.

The preferred range of infrared wavelengths within the electromagnetic spectrum may be 0.7 to 3 microns. The camera may further include a protective housing, which protects the camera from the local thermal and physical environment. The protective housing may protect the camera from the local thermal environment by passage of coolant between the camera the protective housing and the apparatus may further include both coolant and means to pass coolant between the camera the protective housing. The coolant may be nitrogen or air.

The view port preferably comprises glass, most preferably, Pyrex type view port sight glass. The view port may include a surface adjacent to the camera and a surface that is remote from the camera, and the apparatus may include means to purge debris from the surfaces of the view port. The means to purge debris from the adjacent surface may include means to blow air or nitrogen across the adjacent surface. The means to purge debris from the remote surface may include means to blow nitrogen, process gas, or an inert gas across the remote surface.

The monitor may further include a protective housing, which may protect the electronics of the monitor from the local thermal and physical environment. The protective housing may protect the electronics of the monitor from the local thermal environment by passage of coolant through the protective housing of the monitor, and the apparatus may further include both coolant and means to pass coolant through the protective housing of the monitor. The protective housing for the monitor may further include means to produce an air curtain in front of the viewing surface of the monitor to protect the viewing surface from debris in the local environment.

The apparatus may further include a data recording device for recording data and/or images captured by the camera. The data recording device may record still images and/or motion video images. The data recording device may include one or more devices selected from the group consisting of DVDs, CDs, magnetic disks, magnetic tape, or hard drives.

The apparatus may further include one or more spectral filters. The filters may include one or more physical optical filters. The filters may include one or more electronic spectral filters. The filters may be designed to filter one or more of: a) one or more specific ranges of the electromagnetic spectrum, and b) one or more individual frequencies of the electromagnetic spectrum.

The camera may be mounted on a moveable mounting means which allows the position of the camera and/or the view angle of the camera to be adjusted. The moveable mounting apparatus may include means to automatically move the camera and also may include remote control means to direct the means to automatically move the camera. The camera may be selected to have a spectral response appropriate to the specific molten metal alloy in the melt pot.

The apparatus may further include one or more selected from the group consisting of gas lines, liquid ones, electrical lines or data lines. The data lines may be coaxial cable, fiber optic cable, ethernet, twisted pair, or wireless RF.

Another aspect of the present invention is method for imaging the interior of the hot dip melt pot snout of a hot dip steel coating line. The method include the step of providing a camera which detects images within at least a desired range of infrared wavelengths within the electromagnetic spectrum. The method also includes the step of providing a view port which is transparent at least to the desired range of infrared wavelengths. The view port is positioned to allow view of the desired regions within the melt pot and the camera is positioned relative to the view port and to the melt pot such that the camera can image the desired regions within the melt pot at the desired range of infrared wavelengths. The method also includes the step of providing a monitoring device upon which the captured infrared images from the camera may be projected. The method includes the steps of capturing images of the desired regions within the melt pot at the desired range of infrared wavelengths; and displaying the captured images in a visible form on the monitoring device. The desired range of infrared wavelengths within the electromagnetic spectrum may preferably be 0.7 to 3 microns.

The method may further include the step of protecting the camera from the local thermal and physical environment of by placing the camera in a protective housing. The step of protecting the camera from the local thermal environment may include passing coolant between the camera the protective housing. The coolant may be nitrogen or air.

The view port may comprise glass (preferably, Pyrex type view port sight glass) and may have a surface adjacent to the camera and a surface that is remote from the camera. The method may further include the steps of providing means to purge and purging debris from the surfaces of the view port. The step of purging debris from the adjacent surface may include blowing air or nitrogen across the adjacent surface. The step of purging debris from the remote surface may include blowing nitrogen, process gas, or an inert gas across the remote surface.

The method may further include the step of protecting the electronics of the monitor from the local thermal and physical environment by placing the electronics of the monitor in a protective housing. The step of protecting the electronics of the monitor from the local thermal environment may further include the step of passing of coolant through the protective housing of the monitor. The method may further include the step of producing an air curtain in front of the viewing surface of the monitor to protect the viewing surface from debris in the local environment.

The method may further include the step of recording data and/or images captured by the camera on a data recording device. The step of recording data and/or images captured by the camera may further includes recording still images and/or motion video images. The data recording device may include one or more devices selected from the group consisting of DVDs, CDs, magnetic disks, magnetic tape, or hard drives.

The method may further include the step of electronically and/or optically filtering the image of the interior of the melt pot. The step of electronically and/or optically filtering the image may include filtering one or more of: a) one or more specific ranges of the electromagnetic spectrum, and b) one or more individual frequencies of the electromagnetic spectrum.

The step of providing the camera may include the step of mounting the camera on a moveable mounting means which allows the position of the camera and/or the view angle of the camera to be adjusted. The moveable mounting device may include means to automatically move the camera and remote control means to direct the means to automatically move the camera. The step of providing the camera may include selecting a camera which has a spectral response appropriate to the specific molten metal alloy in the melt pot.

The method may further include the step of providing one or more selected from the group consisting of gas lines, liquid lines, electrical lines or data lines. The data lines may be coaxial cable, fiber optic cable, ethernet, twisted pair, or wireless RF.

DETAILED DESCRIPTION OF THE INVENTION

The present inventors set out to provide a system and method useful for providing information which would allow for improved hot dip production of coated conventional and advanced high strength steel (AHSS) grades. This system and method allows for real time video (still and motion) imaging of the interior environment of a hot dip melt pot snout so that coating operations personnel may make direct observation of snout process conditions and take necessary actions to improve steel strip surface quality. The snout is the location in the hot dip coating line where the steel strip makes first contact with the liquid metal under a reducing atmosphere.

The present inventors have analyzed the problems with prior art systems:

1) Poor imaging and resulting inadequate information provided by conventional snout camera systems that image in the visible region of the spectrum.
2) Poor quality visible images due to inadequate snout interior visible illumination lacking sufficient intensity and uniformity.
3) The inability to image the highly reflective, mirror like liquid metal surface with visible light due to specular reflection resulting in pixel saturation and poor dynamic range.
4) Snout camera view ports are common sources of air leakage (i.e. oxygen and dew point) into the snout where the reduced steel strip is particularly susceptible to oxidation which can be the cause of defects.
5) Accumulation of dust and other ambient mill debris on the exterior of the snout camera view port sight glass results in severe degradation of the image quality.
6) The accumulation of melt dust or other debris on the interior of the snout view port sight glass employed for visible illumination of the snout interior resulting in severe degradation of the image available with a conventional visible snout camera system, and
7) The accumulation of melt dust or other debris on the interior of the snout camera view port sight glass degrades and eventually blocks the view.

The inventors have designed a method and system to view the interior of the hot dip melt pot snout that eliminates most of the downfalls of the prior art system as well as providing valuable information about the interior environment of the hot dip melt pot snout to coating operations personnel.

Before the inventive system, operators making adjustments to the snout interior conditions or snout interior equipment had to work blind as they were unable to see manipulations inside the snout. This increased the time and decreased the efficiency of such operations.

One step forward was the inventors observation that the molten metal, the strip and the hot dip coating line equipment are all at a temperature at which they emit infrared light. Thus, the interior of the hot dip melt pot is self illuminated in the infrared region of the electromagnetic spectrum. Hence, in the broadest sense, the present invention is to the method of using infrared cameras to produce high contrast images of the interior of the hot dip coating line melt pot snout and the apparatus for performing this method. IR is in the electromagnetic above the visible wavelength region. The IR spectrum which is generally useful herein extends from about 0.75 to about 15 microns wavelengths and is not detected by the human eye. As such, the infrared illumination data received by the IR camera is converted and output in a manner which is observable by humans, preferably on a video monitor.

The infrared (IR) camera will of course be mounted such that it can view the interior of the hot dip melt pot snout. The IR camera will be mounted adjacent to a port in the snout. The port is made of a material that is transparent to IR light. Unfortunately, conventional glass optics are opaque to the mid and long wavelength regions of the IR spectrum (i.e. 3-8 μm and 8-15 μm, respectively). Imaging in these wavelengths requires expensive detectors, optics, and snout sight glass windows made of specialty materials. For example, expensive and temperature sensitive silicon or germanium lenses are required in these wavelength ranges.

Therefore, in a preferred embodiment of the instant invention, IR imaging of the snout interior is in the near and short wave infrared spectrum (hereinafter designated as SWIR). The wavelength range for the SWIR spectrum useful in the present invention is in the 0.7 to 3 μm region of the IR spectrum. In this range the SWIR radiation is transparent to standard, inexpensive glass optics and snout sight glass windows (such as Pyrex sight glass ports), thus avoiding the use of expensive materials to construct the view ports. The resulting high quality imaging (at the SWIR wavelengths) provides coating operations personnel with the capability of monitoring snout process conditions and taking necessary actions to improve steel strip surface quality.

It should be noted that since the interior of the snout is self illuminated in the IR wavelengths, no separate illumination sources are required and, as such, fewer openings into the snout interior are required. That is, the present invention takes advantage of the sufficient intensity of emitted radiation (in the IR) in the snout operating environment which exists because the objects of interest are at temperatures near that of the liquid metal bath. The selected radiation provides high contrast imaging of the snout interior and so, no additional ports will be required for illumination sources. This, in turn, reduces the risks for leakage of air (particularly oxygen and water vapor which can oxidize the steel strip) into the snout environment and eliminates issues dealing with dust collecting on the illumination view ports. Furthermore, the present invention eliminates the prior art issue of poor quality visible images due to inadequate snout interior visible illumination due to insufficient intensity and uniformity by completely eliminating the need for visible illumination (i.e. no lamps are required). For an example of a prior art visible light image having inadequate lighting, see FIG. 2.

As mentioned above, the prior art visible light systems also suffered from the inability to image the highly reflective, mirror like liquid metal surface with visible light due to specular reflection resulting in pixel saturation and poor dynamic range. Because the subject invention images in the IR region of the spectrum rather than with visible reflected light this is not an issue. For an example of a prior art visible light image washed out by reflected light from the surface of the molten metal, see FIG. 3.

While the issue of dust buildup on the illumination ports has been eliminated by elimination of need for illumination (and therefore illumination ports), the present system still requires at least one observation port. Accumulation of dust and other ambient mill debris on the exterior of the snout camera view port sight glass could still occur and would result in severe degradation of the image quality. To minimize this problem, the subject invention solves this problem through the use of a camera housing designed to purge the external surface of the snout camera view port with excess camera coolant such as nitrogen or air. It should be noted that the exterior environment of the hot dip melt pot snout is very warm/hot, particularly where the camera is to be mounted. To protect the camera, it is placed in a housing which allows the camera to be bathed in coolant. Lower temperature coolant enters the camera housing, it heated by exchange with the camera and the housing, and higher temperature coolant exits the housing. As this warmer coolant exits the camera housing it can be used to facilitate the purge of dust from the exterior surface of the camera view port by being blown across or in front of the port. Alternatively the gas for the port purge stream may be taken from the coolant supply stream before it enters the camera housing as long as there is sufficient coolant remaining to adequately protect the camera. Further, the gas for the port purge stream may be supplied by a separate input not affiliated with the camera housing.

Of course, there is still the problem of the accumulation of melt dust or other debris on the interior of the snout camera view port sight glass. The subject invention significantly reduces this problem through the use of a purge ring specifically engineered to inhibit interior accumulation and reduce the frequency of snout camera port sight glass maintenance. The purge ring works similar to the exterior purge, but uses nitrogen, process gas (the reducing gaseous atmosphere of the snout, typically a mixture of hydrogen and nitrogen) or an inert gas as the purge gas, because air would contain oxygen and/or water vapor which would oxidize the reduced steel strip, resulting in inferior product.

The video output from the camera system can be recorded on any electronic medium, such as, for example, optical disc (CD, DVD), magnetic tape or disk, hard drives, or the like. The video output may also be output to high temperature video displays, which may be placed remotely or near the pot so that operators may view in real time as corrections or adjustments are made to process conditions inside the snout. The monitors may be, as needed, housed in cooled, sealed outer casings (similar to the camera housing and for the same reason) and may be additionally equipped with an air curtain to cool the monitor viewing surface and keep it free from ambient mill debris.

The present invention employs one or more suitable IR camera that is selected and configured as necessary (software, optics, filters) for real time video imaging within the 0.7 to 3 μm (SWIR) region of the electromagnetic spectrum. Depending upon the molten metal chemistry, temperature, and contrast properties, imaging may be conducted across the full 0.7 to 3 μm SWIR region, a smaller band of wavelengths within the SWIR region, or at one or more specific wavelengths within the SWIR region. Optics and filters may be designed and selected for optimal field of view (FOV) and image characteristics.

The camera/housing may be mounted on a delivery/mounting system as demanded by the snout geometry. Supporting apparatus (cooling lines, cabling, electrical, and display) may also installed as needed. The system's data lines may be configured with one or more of coaxial cable, fiber optic cable, ethernet, twisted pair, or wireless RF. All electronics and other equipment are housed in sturdy protective enclosures such as Faraday cages or Hoffman boxes.

The geometry of the snout camera view ports (angle, length, sight glass diameter, etc) may be optimized for field of view. Common snout camera configurations include field of views from the snout center to opposite edge or from the snout center to same edge as needed by coating operation personnel.

Figure 4:
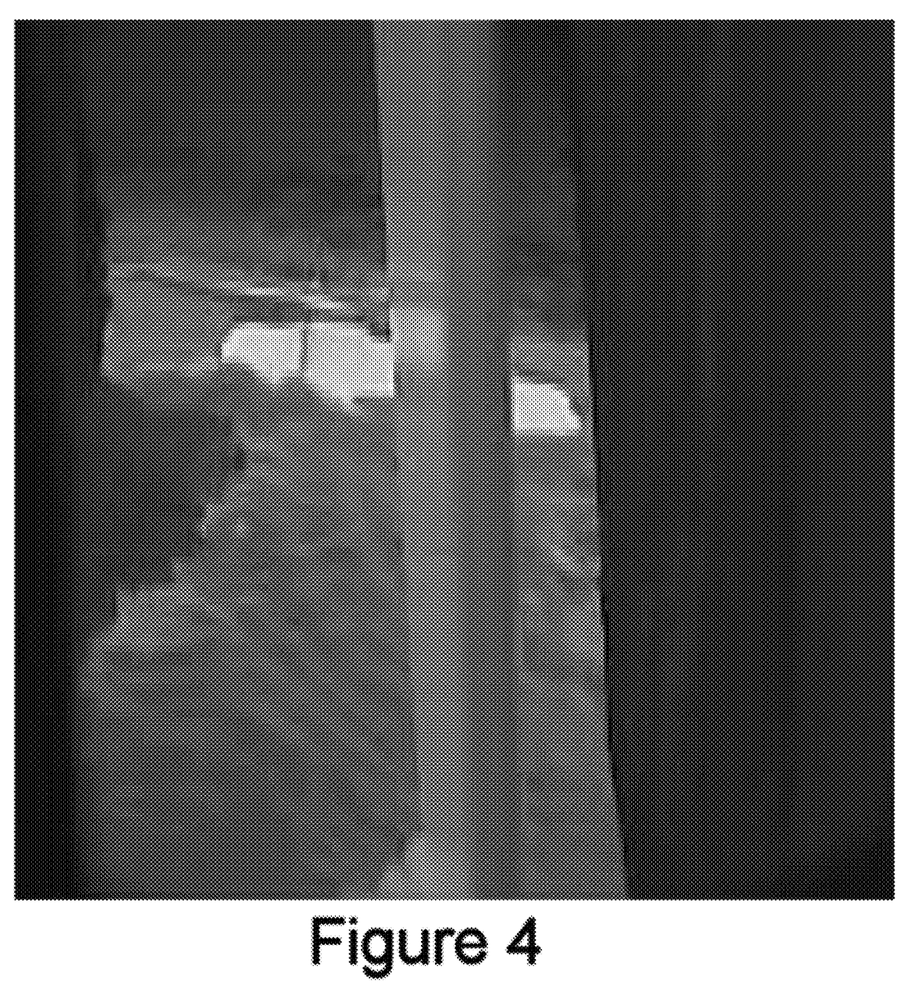
FIG. 4 is an infrared image of the present invention of the interior of a hot dip melt pot snout.
Figure 5:
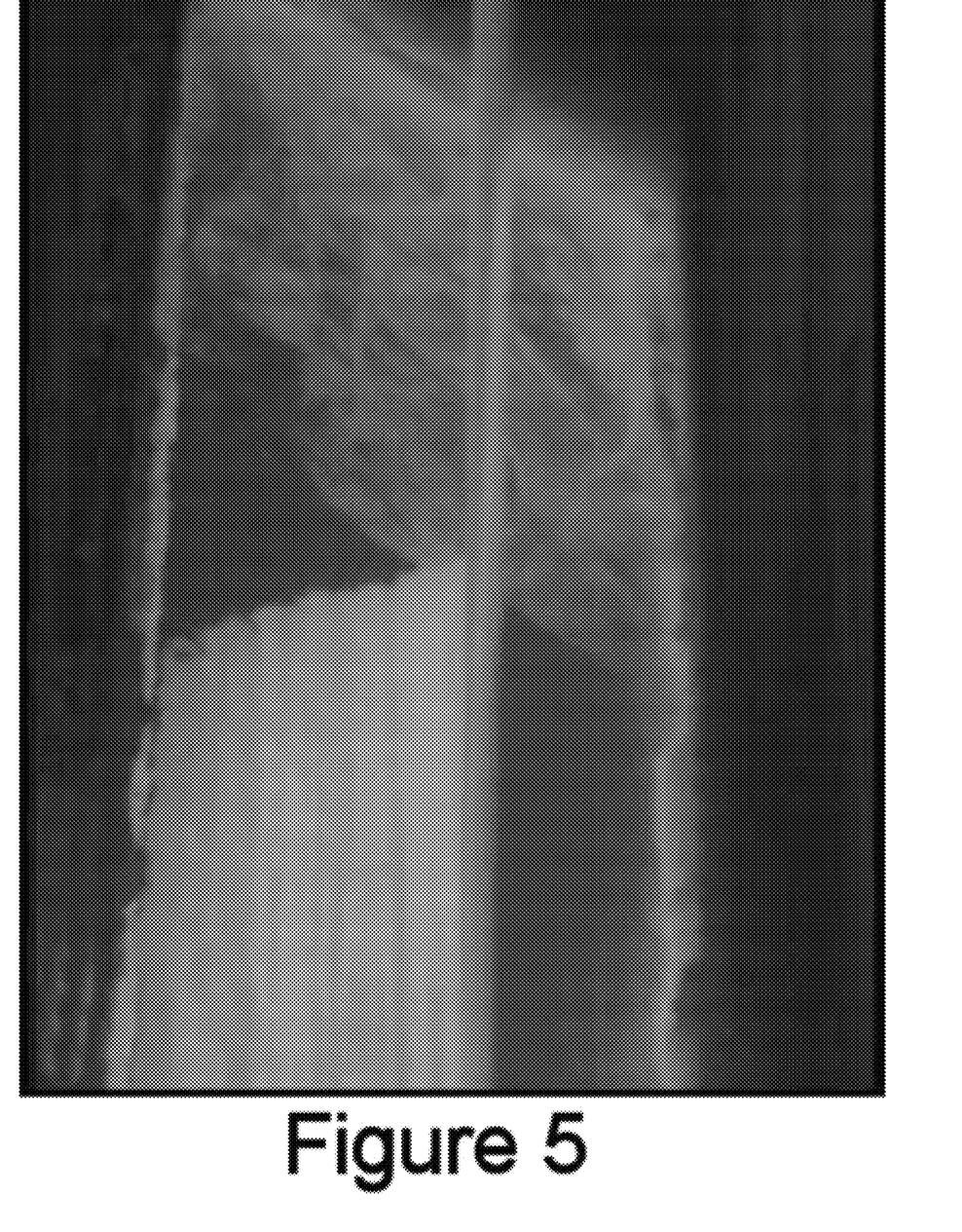
FIG. 5 is another infrared image of the present invention of the interior of a hot dip melt pot snout.

FIGS. 4 and 5 are images of the interior of a typical hot dip melt pot snout captured in SWIR wavelengths. The camera system is mounted on one side of the snout viewing across the liquid metal melt surface to the opposite side of the snout. Some objects of interest within the typical field of view of the inventive camera system include (a) the front and rear snout walls, (b) the snout side wall opposite to the camera, (c) the steel strip, (d) the snout interior liquid metal melt surface, and (e) any additional equipment present inside the snout.

In general, the right and left of each image is framed in black by the front and rear faces of the snout and the opposite snout side wall is seen in the upper center of the image. The steel strip can be seen descending in the center of the image from the upper snout region into the liquid metal melt surface. The camera lenses are selected such that the liquid metal melt surface occupies a significant portion of the field of view. Any other equipment present in the snout is readily observable. For example, the white object behind the strip near the snout side wall in FIG. 4 is a snout pump nozzle.

Figure 2:
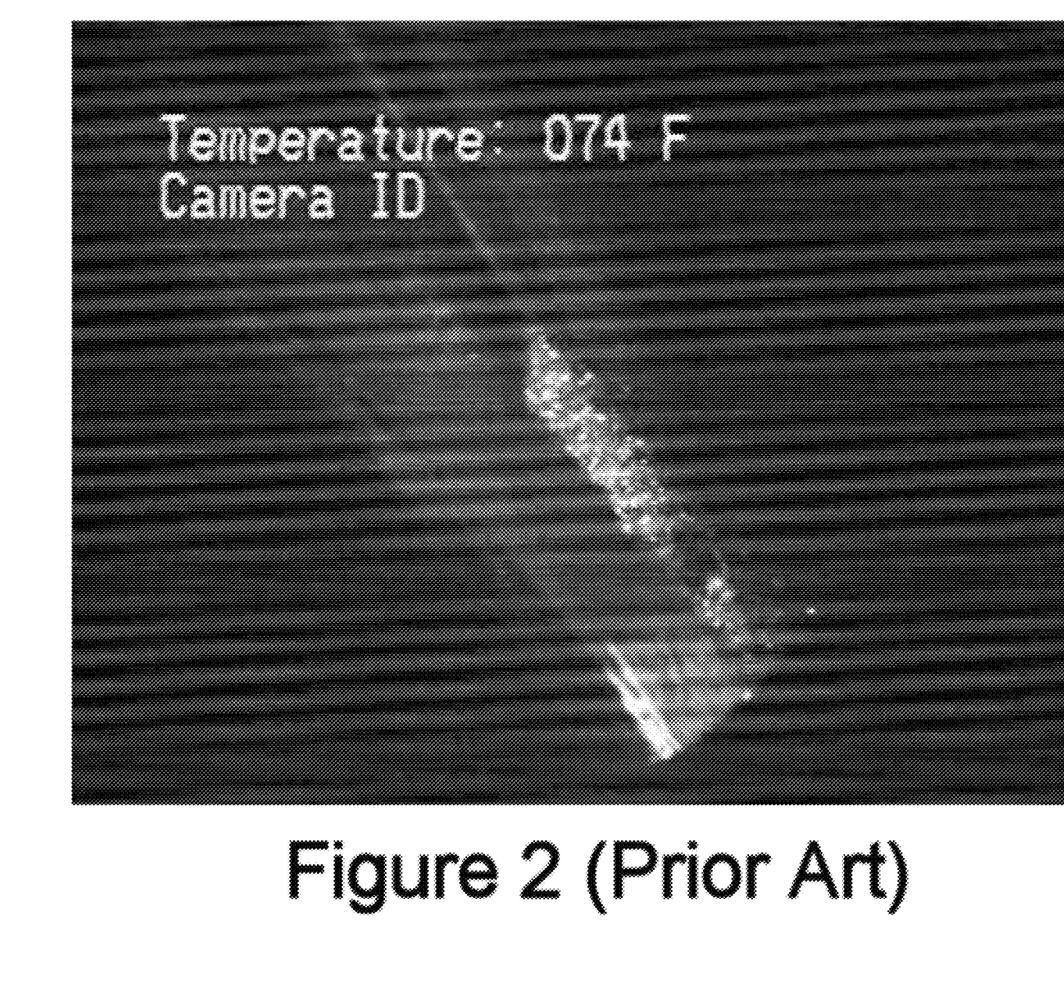
FIG. 2 is a prior art visible wavelength image of the interior of a hot dip melt pot snout where the image has inadequate lighting, including dark areas and bright areas with specular reflection.
Figure 3:
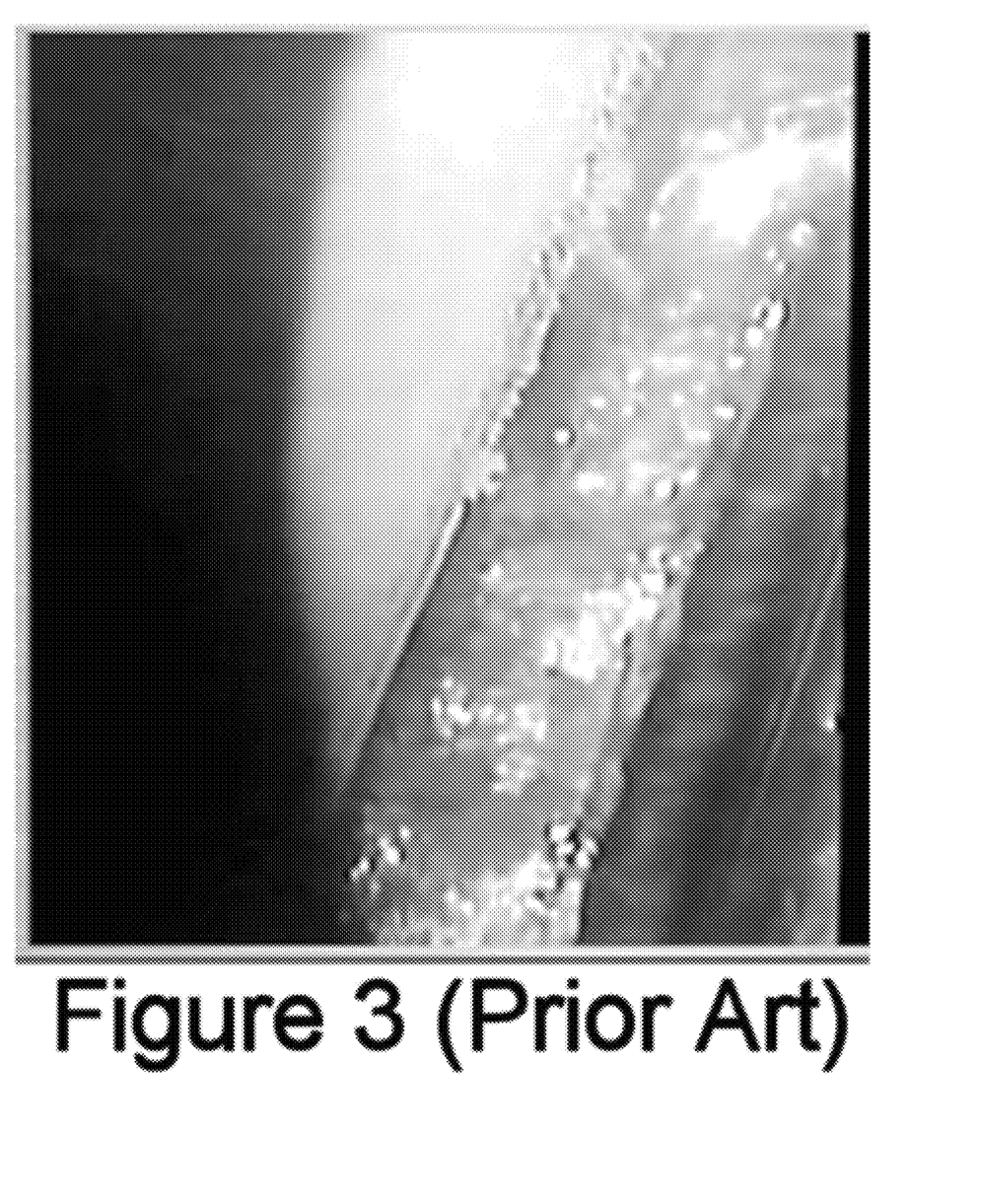
FIG. 3 is a prior art visible wavelength image of the interior of hot dip melt pot snout demonstrating poor image information content due to over-saturation.

As demonstrated in FIGS. 2 and 3, hot dip coating operations personnel were not able to effectively observe, monitor, and control snout process conditions when using prior art visible light camera system. The present invention provides high quality imaging of process critical features that have a practical impact upon product quality. Examples of these critical snout process features include: (a) solidified liquid metal build up or other debris deposited on the snout wall interior; (b) debris drifting through the snout atmosphere; (a) features of the steel strip including position, shape, and motion; (d) standing waves and flow pattern motion of the liquid metal; (e) accumulation and motion of dross and other liquid metal melt surface debris; and (f) position and performance of snout equipment.

Figure 6:
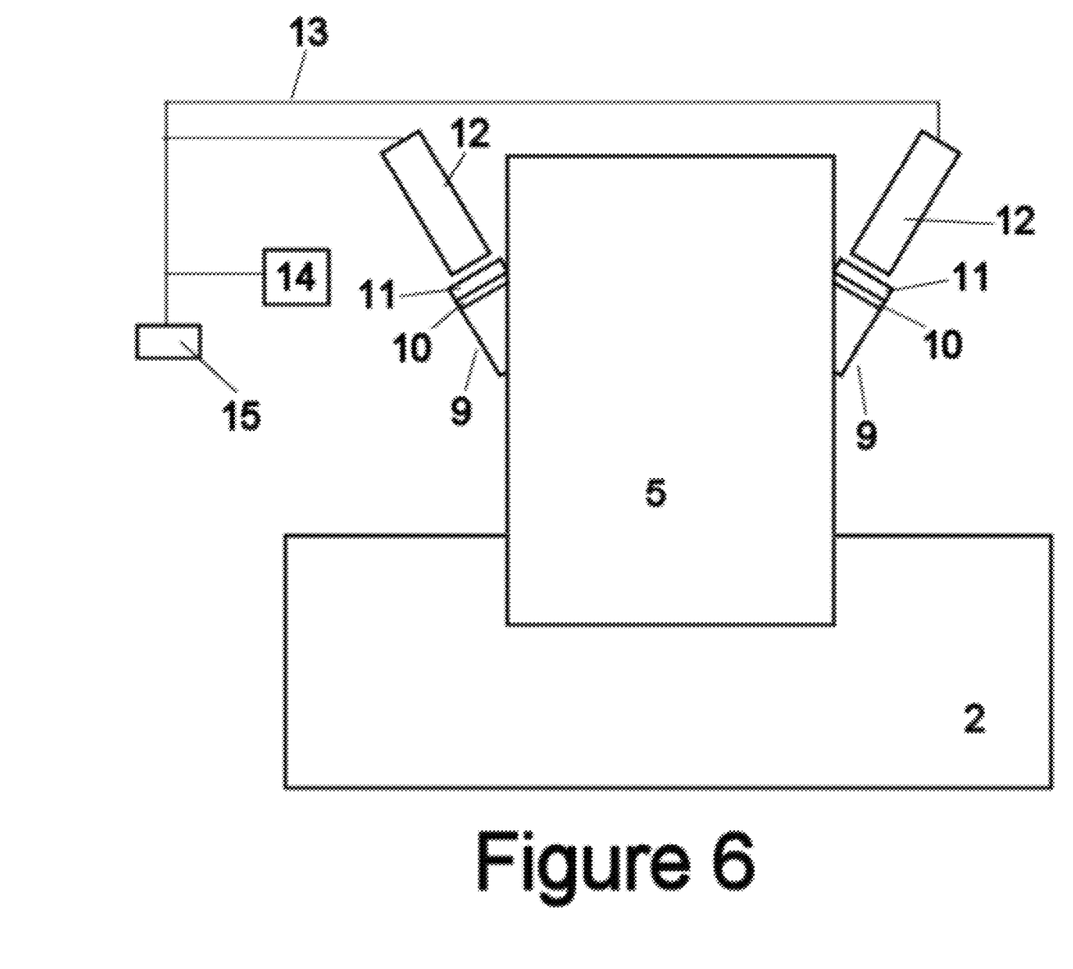
FIG. 6 depicts a simplified diagram of an embodiment of the present SWIR camera system as intended to be installed on a hot dip coating line.

FIG. 6 depicts a simplified diagram of an embodiment of the present SWIR camera system as intended to be installed on a hot dip coating line. The coating line has a hot dip melt pot 2, and a hot dip melt pot snout 5. The hot dip melt pot snout 5 has one or more view ports 9. The view ports include a view port sight glass 11 and a purge ring 10. In addition to the view ports, the system includes one or more cameras 12 that image in the IR region of the electromagnetic spectrum (preferably in the SWIR region). The cameras are connected by data lines 13 to a monitoring system 14 and/or a data recording system 15

It is to be understood that the disclosure set forth herein is presented in the form of detailed embodiments described for the purpose of making a full and complete disclosure of the present invention, and that such details are not to be interpreted as limiting the true scope of this invention as set forth and defined in the appended claims.

We claim:
1. An apparatus including:
    a hot dip steel coating line melt pot;

a melt pot snout; and an imaging system for imaging the interior of said melt pot snout, said imaging system comprising:

an infrared camera which detects images within at least 0.7 to 3 microns infrared wavelengths;

a view port transparent at least to said infrared wavelengths; said view port positioned to allow view of the interior of said melt pot snout;

said infrared camera positioned relative to said view port and to said melt pot snout such that said infrared camera can image the interior of said melt pot snout at said 0.7 to 3 microns infrared wavelengths without external illumination; and a monitoring device upon which the detected infrared images from said infrared camera may be projected.

2. The apparatus of claim 1, wherein said infrared camera further includes a protective housing.

3. The apparatus of claim 2, wherein said protective housing protects said infrared camera from the local thermal and physical environment.

4. The apparatus of claim 3, wherein said protective housing protects said infrared camera from the local thermal environment by passage of coolant between said infrared camera and said protective housing.

5. The apparatus of claim 4, wherein said coolant is nitrogen or air.

6. The apparatus of claim 1, wherein said view port comprises port sight glass which is transparent to the infrared wavelengths range of 0.7 to 3 microns.

7. The apparatus of claim 1, wherein said view port includes a surface adjacent to said infrared camera and a surface that is remote from said infrared camera, and said apparatus includes purge rings to purge debris from the surfaces of said view port.

8. The apparatus of claim 7, wherein said purge rings include blowers to blow air or nitrogen across said adjacent surface.

9. The apparatus of claim 7, wherein said purge rings include blowers to blow nitrogen, process gas, or an inert gas across said remote surface.

10. The apparatus of claim 1, wherein said monitor further includes a protective housing.

11. The apparatus of claim 10, wherein said protective housing protects the electronics of said monitor from the local thermal and physical environment.

12. The apparatus of claim 11, wherein said protective housing protects the electronics of said monitor from the local thermal environment by passage of coolant through said protective housing of said monitor.

13. The apparatus of claim 10, wherein said protective housing for said monitor further includes an air curtain in front of the viewing surface of said monitor to protect said viewing surface from debris in the local environment.

14. The apparatus of claim 1, wherein said apparatus further includes a data recording device for recording at least one of data and images captured by said infrared camera.

15. The apparatus of claim 14, wherein said data recording device records at least one of still images and motion video images.

16. The apparatus of claim 14, wherein said data recording device includes one or more devices selected from the group consisting of DVDs, CDs, magnetic disks, magnetic tape, or hard drives.

17. The apparatus of claim 1, wherein said apparatus further includes one or more spectral filters.

18. The apparatus of claim 17, wherein said one or more spectral filters includes one or more physical optical filters.

19. The apparatus of claim 17, wherein said one or more spectral filters includes one or more electronic spectral filters.

20. The apparatus of claim 17, wherein said one or more spectral filters are designed to filter one or more of:
   a) one or more specific ranges of the electromagnetic spectrum, and
   b) one or more individual frequencies of the electromagnetic spectrum.

21. The apparatus of claim 1, wherein said infrared camera is affixed to a moveable mount for adjustment of at least one of the position of said infrared camera and the view angle of said infrared camera.

22. The apparatus of claim 1, wherein said apparatus further includes one or more selected from the group consisting of gas lines, liquid lines, electrical lines or data lines.

23. The apparatus of claim 22, wherein said data lines are one or more of coaxial cable, fiber optic cable, ethernet, twisted pair, or wireless RF.

24. A method for imaging the interior of the melt pot snout of a hot dip steel coating line comprising the steps of:

providing a hot dip steel coating line melt pot;

providing a melt pot snout;

providing an infrared camera which detects images within 0.7 to 3 microns infrared wavelengths;

providing a view port which is transparent at least to said infrared wavelengths;

positioning said view port to allow view of the interior of said melt pot snout;

positioning said infrared camera relative to said view port and to said melt pot snout such that said infrared camera can image said interior of said melt pot snout at said 0.7 to 3 microns infrared wavelengths without external illumination;

providing a monitoring device upon which the captured infrared images from said infrared camera may be projected;

capturing images of said interior of said melt pot snout at said infrared wavelengths; and displaying said captured images in a visible form on said monitoring device.

25. The method of claim 24, wherein method further includes the step of protecting said infrared camera from the local thermal and physical environment of by placing said infrared camera in a protective housing.

26. The method of claim 25, wherein said step of protecting said infrared camera from said local thermal environment includes passing coolant between said infrared camera and said protective housing.

27. The method of claim 26, wherein said coolant is nitrogen or air.

28. The method of claim 24, wherein said view port comprises port sight glass which is transparent to the infrared wavelengths range of 0.7 to 3 microns.

29. The method of claim 24, wherein said view port includes a surface adjacent to said infrared camera and a surface that is remote from said infrared camera, and said method includes the steps of providing purge rings to purge and purging debris from the surfaces of said view port.

30. The method of claim 29, wherein said step of purging debris includes blowing air or nitrogen across said adjacent surface.

31. The method of claim 29, wherein said step of purging debris includes blowing nitrogen, process gas, or an inert gas across said remote surface.

32. The method of claim 24, wherein said method further includes the step of protecting the electronics of said monitor from the local thermal and physical environment by placing said electronics of said monitor in a protective housing.

33. The method of claim 32, wherein said step of protecting said electronics of said monitor from said local thermal environment includes the step of passing of coolant through said protective housing of said monitor.

34. The method of claim 32, wherein said method includes the step of producing an air curtain in front of the viewing surface of said monitor to protect said viewing surface from debris in the local environment.

35. The method of claim 24, wherein said method further includes the step of recording at least one of data and images captured by said infrared camera on a data recording device.

36. The method of claim 35, wherein said step of recording at least one of data and images captured by said infrared camera includes recording at least one of still images and motion video images.

37. The method of claim 35, wherein said data recording device includes one or more devices selected from the group consisting of DVDs, CDs, magnetic disks, magnetic tape, or hard drives.

38. The method of claim 24, wherein said method further includes the step of filtering by at least one of electronic and optical filtering said image of said interior of said melt pot snout.

39. The method of claim 38, wherein said step of filtering by at least one of electronic and optical filtering said image includes filtering one or more of:
  a) one or more specific ranges of the electromagnetic spectrum, and
  b) one or more individual frequencies of the electromagnetic spectrum.

40. The method of claim 24, wherein said step of providing said infrared camera includes the step of affixing said infrared camera to a moveable mount for adjustment of at least one of the position of said infrared camera and the view angle of said infrared camera.

41. The method of claim 24, wherein said method further includes the step of providing one or more selected from the group consisting of gas lines, liquid lines, electrical lines or data lines.

42. The method of claim 41, wherein said data lines are one or more of coaxial cable, fiber optic cable, ethernet, twisted pair, or wireless RF.

43. An apparatus including:
a hot dip steel coating line melt pot;
a melt pot snout; and
an imaging system for imaging the interior of said melt pot snout, said imaging system comprising:
an infrared camera which detects images within a range of infrared wavelengths within an electromagnetic spectrum;
a view port transparent at least to said range of infrared wavelengths; said view port positioned to allow view of a region within the interior of said melt pot snout;
said infrared camera positioned relative to said view port and to said melt pot snout such that said infrared camera can image the interior of said melt pot snout at said range of infrared wavelengths without external illumination; and
a monitoring device upon which the detected infrared images from said infrared camera may be projected.

44. A method for imaging the interior of the melt pot snout of a hot dip steel coating line comprising the steps of:
providing a hot dip steel coating line melt pot;
providing a melt pot snout;
providing an infrared camera;
providing a view port which is transparent to infrared wavelengths of the images detected by the infrared camera;
positioning said view port to allow view interior of said melt pot snout;
positioning said infrared camera relative to said view port and to said melt pot snout such that said infrared camera can image said interior of said melt pot snout;
providing a monitoring device upon which the captured infrared images from said infrared camera may be projected;
capturing images of said interior of said melt pot snout without external illumination; and
displaying said captured images in a visible form on said monitoring device.

45. The method of claim 44, wherein said infrared camera captures images at 0.7 to 3 microns infrared wavelengths.

46. The method of claim 44, wherein said infrared camera produces high contrast images of said interior of said melt pot snout.

* * * * *